(12) United States Patent
Frere et al.

(10) Patent No.: US 8,586,143 B2
(45) Date of Patent: Nov. 19, 2013

(54) CAPSULES WITH A MODIFIED SURFACE FOR GRAFTING ONTO FIBRES

(75) Inventors: Yves Frere, Holtzheim (FR); Louis Danicher, Strasbourg (FR); Mahdi Merji, Sousse (TN)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 840 days.

(21) Appl. No.: 12/279,990

(22) PCT Filed: Feb. 19, 2007

(86) PCT No.: PCT/FR2007/000299
§ 371 (c)(1),
(2), (4) Date: Mar. 23, 2009

(87) PCT Pub. No.: WO2007/096513
PCT Pub. Date: Aug. 30, 2007

(65) Prior Publication Data
US 2009/0325438 A1 Dec. 31, 2009

(30) Foreign Application Priority Data
Feb. 20, 2006 (FR) ..................................... 06 01467

(51) Int. Cl.
*B05D 3/04* (2006.01)
(52) U.S. Cl.
USPC ............ 427/301; 442/59; 428/327; 428/372; 427/180; 427/569; 427/314; 427/299

(58) Field of Classification Search
USPC ............ 427/301, 180, 569, 314, 299; 442/59; 428/327, 372
See application file for complete search history.

(56) References Cited

U.S. PATENT DOCUMENTS

| | | | |
|---|---|---|---|
| 4,882,220 A * | 11/1989 | Ono et al. | 442/96 |
| 6,645,569 B2 * | 11/2003 | Cramer et al. | 427/466 |
| 2002/0155771 A1 * | 10/2002 | Soane et al. | 442/79 |
| 2003/0013369 A1 * | 1/2003 | Soane et al. | 442/181 |
| 2003/0062507 A1 * | 4/2003 | Radomyselski et al. | 252/8.91 |
| 2004/0241485 A1 * | 12/2004 | Kleban et al. | 428/540 |

FOREIGN PATENT DOCUMENTS

| | | |
|---|---|---|
| EP | 1 398 074 A1 | 3/2004 |
| WO | 01/06054 A1 | 1/2001 |
| WO | 03/097228 A1 | 11/2003 |
| WO | 2006/013165 A1 | 2/2006 |

* cited by examiner

*Primary Examiner* — Timothy Meeks
*Assistant Examiner* — Nathan T Leong
(74) *Attorney, Agent, or Firm* — Young & Thompson

(57) ABSTRACT

The present invention relates to a method of grafting, by covalent bonding, hollow or solid composite capsules onto any type of natural, artificial or synthetic, organic or inorganic, support, the capsules being chemically, physically or physico-chemically modified, so as possibly to improve their affinity with the support and to functionalize them, and then grafted, after the capsules and/or the support have been activated. The invention also relates to the capsules thus modified, to the supports grafted by the capsules, especially fibres and textiles, and also to the use of these grafted supports, especially fibres and textiles, for making up what are called "functional" articles.

24 Claims, 3 Drawing Sheets

CAPSULES WITH A MODIFIED SURFACE FOR GRAFTING ONTO FIBRES

FIELD OF THE INVENTION

The present invention relates to a method for grafting, by covalent bonding, hollow or solid composite capsules onto any type of natural, artificial or synthetic, organic or inorganic support, said capsules being chemically, physically or physicochemically modified so as to optionally improve their affinity with said support and to functionalise them, and then grafting after said capsules and/or said support have been activated.

The invention also relates to the capsules thus modified, the supports grafted with said capsules, in particular fibres and textiles, and the use of said grafted supports, in particular fibres and textiles, for producing what are known as "functional" articles.

More particularly, the present invention relates to a method for grafting polymer membrane composite capsules optionally comprising one or more active ingredients, onto any type of support, in particular fibres, such as textile fibres, glass fibres, paper, wood and other fibres. The invention also relates to modified composite capsules able to be grafted onto said supports, as well as the supports grafted by these capsules and the articles obtained with said grafted supports.

BACKGROUND OF THE INVENTION

Nowadays, the textile industry is experiencing a surge in the field of what is known as "functional" clothing. This clothing is made mainly of textile, natural, artificial or synthetic fibres comprising various active ingredients and enabling the clothing, for example, to store and give out heat, to release fragrances, moisturising and therapeutic agents fairly quickly, or even to trap or retain various organic or inorganic compounds coming into contact with the fibres, etc.

Generally, the active ingredients are encapsulated in microcapsules which are fixed to or associated with the fibres in various manners, for example by inclusion, coating, or even by ionic bonding. These microcapsules may be sensitive, for example, to body heat and/or to the external environment, thus influencing the release of different molecules.

With regard to the method of fixing by inclusion, the capsules are directly enclosed within the fibre. The advantage of this method is that the capsules are permanently fixed in the fibre. The drawback, however, is that this method can only be used for synthetic fibres threaded by extrusion at a low temperature. Also, the encapsulated active ingredient is not easily accessible or diffuses with difficulty through the membrane of the capsule and through the fibre to the surface thereof.

This is why, nowadays, coating technology is generally used to fix capsules onto any type of fibre, in particular onto natural fibres. The capsules are dispersed in a cross-linked polymer which is coated onto the fibres. In this case also, the capsules are permanently fixed and the method may be carried out without difficulty. However, the fibres thus coated with the cross-linked polymer in which the capsules are dispersed are not as pleasant to touch.

Furthermore, in the previous case, the encapsulated active ingredient is not easily accessible or has difficulty diffusing through the membrane of the capsule and through the varnish coating.

Another method also makes use of fixing the capsules, by ionic bonding, onto the fibres. This method utilises the fact that the fibres generally have surface potential. The capsules are synthesised so as to have cationic or anionic functional groups on the external surface of the membrane and are fixed by ionic bonding onto the fibres. In this case also, one advantage is that the method may be carried out in a very simple manner. The major drawback is the very resistance to wetting. After a few washes, almost all the capsules have disappeared from the surface of the fibres.

The latest techniques use the known methods for grafting dyes onto textile fibres, that is to say grafting by way of covalent bonding. Thus, for example, patent application WO 01/06054 discloses an active ingredient contained in a polymer capsule, of which the surface has reactive groups enabling said covalent bonding with the fibre via a binder.

However, the description of this technique is rather general and the examples relate only to cotton fibres, onto which capsules containing an active ingredient are grafted, said capsules being bonded to cotton fibres via a "bridge" formed by a resin having methylol groups.

In these examples, covalent bonding is created between two hydroxyl (—OH) groups with the elimination of a water molecule in the presence of a Lewis acid-type catalyst.

This method has many drawbacks, in particular that of producing water as a by-product and requiring use of a catalyst. Furthermore, the resin having methylol groups is a urea-type resin. These groups may inter-react in an undesirable manner with the polymer capsules, in particular by forming agglomerates of capsules detrimental to a good distribution of the capsules on the fibres.

The applicant has now discovered a method for grafting solid or hollow composite capsules onto fibres, in particular textile fibres, said method also being suitable for grafting said capsules onto any type of support, having directly or latently, or even after pretreatment, functional groups able to form covalent bonds with said capsules.

SUMMARY OF THE INVENTION

The present invention accordingly relates to a method for grafting, by covalent bonding, hollow or solid polymer capsules optionally containing an active ingredient onto any type of support, especially fibres, in particular textile fibres, said method having none of the drawbacks of the methods known from the prior art.

The method of the present invention makes it possible, inter alia, to address the need for "functional" textile fibres, in particular capable of storing and giving off heat, releasing fragrances, moisturisers and therapeutic agents fairly quickly, or even trapping or retaining various organic or inorganic compounds coming into contact with the fibres, whilst having none of the drawbacks known from the prior art.

Thus, a first object of the present invention is to provide a method for grafting hollow or solid polymer capsules, optionally containing at least one active ingredient, onto a natural, artificial or synthetic, organic or inorganic support, the grafting of said capsules being stronger than existing fixing techniques.

One object of the invention is also to provide a method for definitively grafting hollow composite polymer capsules, optionally containing at least one liposoluble or water soluble active ingredient onto a natural, artificial or synthetic, organic or inorganic support via a strong chemical bond.

Another object of the invention is to provide a method for grafting hollow or solid composite polymer capsules, optionally containing at least one liposoluble or water soluble active ingredient, onto a natural, artificial or synthetic, organic or inorganic support, whilst maintaining the intrinsic quality of said support.

A further object of the present invention is to provide a method for grafting hollow or solid composite polymer capsules, optionally containing at least one liposoluble or water soluble active ingredient, onto a natural, artificial or synthetic, organic or inorganic support, of which the qualities, in particular those to the touch, remain substantially unchanged.

Consequently, the object of the present invention is to provide a method for grafting hollow or solid composite polymer capsules, optionally containing at least one liposoluble or water soluble active ingredient onto a natural, artificial or synthetic, organic or inorganic support, in particular natural, artificial or synthetic, organic or inorganic fibres, without using a coating agent on said support or said fibres.

A further object of the present invention is to provide a method for grafting hollow or solid composite polymer capsules, optionally containing at least one liposoluble or water soluble active ingredient, onto a natural, artificial or synthetic, organic or inorganic support, in particular fibres, said capsules being grafted onto said support or said fibres in a homogeneous and controlled manner.

Other objects of the invention will become clear upon reading the following description of the invention. It has now been found that these objects may be achieved, either completely or in part, using the grafting method according to the present invention.

DETAILED DESCRIPTION OF THE INVENTION

Figure 1:
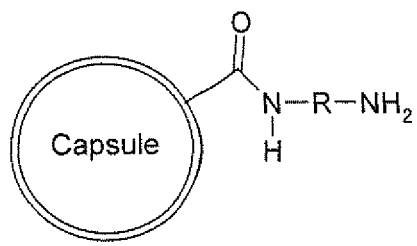
FIG. 1 schematically shows a polyamide capsule according to the invention.

Within the meaning of the present invention and as indicated above, the term "support" denotes any substrate having directly or latently, or after pre-treatment or even after activation, functional groups able to form covalent bonds with said capsules.

Examples of functional groups or even reactive groups will be described hereinafter in the present document and comprise any type of chemical reactive group known within the field of chemistry as being able to form, with other groups, stable chemical bonds of the covalent bond type. Non-limiting examples of groups of this type are hydroxy, thiol, epoxy, carboxy, halogen, amino, amido, oxo, thioxo, cyano, ethylenically unsaturated or acetylenically unsaturated groups and others.

The groups may be present directly on the support or in latent form and may be rendered active (activation step) by means of one or more chemical, physical or physicochemical treatments known to the person skilled in the art. The support according to the invention may also be free from, or may have an insufficient quantity of, reactive groups. In these cases, a pre-treatment, also known in the field such as, but not limited to, a plasma or corona treatment is carried out so as to produce or multiply reactive groups on the support.

The supports which are suitable within the meaning of the invention are advantageously, but not limited to, wood, paper, rock and minerals in general, glass, plants, leather, skin, polymers and plastics materials in general and others. Composite supports comprising two or more of these supports are also included in the present invention.

The support which may be used in the method according to the present invention may be present in its crude form or in any form and, in particular, in the form of a film, coating, paint, varnish, sheet, plate, fibre, thread or other.

A particularly preferred support for the method according to the invention is a support in the form of fibres, in particular textile fibres, wood fibres, glass fibres, carbon fibres, and, in particular, textile fibres.

It should be noted that "fibre" means any object, of which the length is much greater, approximately several hundred to one thousand times greater or more, than its cross-section. The cross-section of a fibre may be of any shape: round, jagged or ribbed or even bean-shaped, as well as multilobal, in particular trilobal or pentalobal, X-shaped, strip-shaped, hollow, square, triangular, elliptical or other.

"Inorganic fibre" means a fibre of mineral origin, such as glass fibre, carbon fibre, etc. Conversely, the term "organic fibre" includes any fibre which is not of mineral origin.

A natural fibre is, by definition, a fibre naturally present in nature, either directly or after mechanical and/or physical treatment. This category comprises fibres of vegetable origin, for example cotton, linen, wood, hemp, ramie, jute, and cells of animal origin, such as wool, silk, angora, etc.

With regard to artificial fibres, they are produced from natural fibres which have undergone one or more chemical treatments so as to improve, in particular, the mechanical and/or physicochemical properties. Thus, cellulosic fibres are obtained by reproducing or modifying cellulose, and are, for example, those fibres known as viscose, acetate, triacetate, etc.

Synthetic fibres include those fibres obtained by chemical synthesis and are generally fibres formed from one or more, monocomponent or multicomponent (for example of the core-sheath type) polymers and/or copolymers which are generally extruded and/or drawn to the desired diameter of the fibre. Examples of synthetic fibres are polyester, polyamide, of which a known example is nylon, poly(vinylchloride), polyethylene, polypropylene, etc.

The fibres are basically characterised by their length. They may be short (for example cotton) or long (wool) or may even be present in the form of brins, for example silk. Rather than referring to the diameter of the fibres, it is routine in the field of textile fibres to characterise them by their yarn count. The most widespread unit of yarn count is the tex and sub-multiples thereof, such as the decitex (or dtex) or the millitex (mtex). A fibre which measures 1 tex is a fibre 1 meter long, of which the weight is equal to 1 milligram (1 tex=1 $mg.m^{-1}$).

The present invention therefore relates to a method for grafting hollow or solid polymer composite capsules onto any type of support, in particular onto fibres, in particular textile fibres, such as those defined above.

"Composite capsule" means any type of individualised particle forned by a polymer part and an "active ingredient" (or "active ingredient or substance") part. "Hollow composite capsule" means a particle formed by a continuous solid polymer membrane enveloping one or more cores optionally containing one or more active ingredients (that is to say an encapsulated product). "Solid composite capsule" means a particle formed by a continuous polymer material in which one or more active ingredients are dispersed. The composite capsules act as reservoirs and enable the active ingredients to be isolated or retained or released. These particles are generally between several nanometers and several millimeters large.

The capsule is generally formed by a membrane, of which the role is, on the one hand to isolate the active ingredient from the external environment and, on the other, to enable better conservation of said active substance and even immediate, prolonged, delayed and/or controlled vectorisation and/or release of the encapsulated active substance in conventional uses of the encapsulated products. The active ingredient may also "trap" molecules outside the capsule which have passed through the membrane or which have diffused through the membrane.

The term "encapsulated product" means that a product is enclosed, in a solid or liquid or even gaseous state, either alone or in combination with formulation agents, in a hollow body or in a continuous medium—the capsule—so as to isolate it from the external environment.

There are many methods for preparing capsules, examples of which are, in particular, synthesizing capsules by simple or complex coacervation, or by fusion or gelling of the support material (spray coating). Other techniques make use of emulsion or dispersion or suspension polymerisation, synthesis of solid particles, synthesis of vesicles, or even synthesis of capsules by fluidised bed, or by coating, for example in an air fluidised bed.

Another method makes use of the technique of interfacial polycondensation in a dispersed medium, a technique disclosed, for example, by P. W. Morgan et coll., *J. Polym. Sci*, 40, (1959), 299-327 for synthesizing sheet films. This technique has been adapted for synthesizing capsules (R. Arshady, *J. Microencap.*, 6(1), (10989), 1-10 et 13-28).

Any type of composite capsule thus defined by the way in which it is obtained may be suitable, it being understood that the surface of the capsule has, or may have, after chemical, physical or physicochemical treatment, at least one reactive group able to bond, either directly or via one or more other reactive groups, to at least one reactive group present on the fibre.

The polymers constituting capsule membranes are advantageously selected from current polymers, such as polyesters, polyamides, polyurethanes or even natural polymers of vegetable or marine origin.

For example, preparing capsules by interfacial polycondensation in a dispersed medium results in capsules which are particularly suitable for grafting onto fibres according to the present invention. In fact, the capsules prepared by this method have the advantage, in particular, of offering a very diverse nature of the polymer constituting the membrane and, consequently a very great diversity of reactive groups able to form covalent bonds with the reactive groups present on the fibres.

It is in fact possible to obtain, by interfacial polycondensation in a dispersed medium, capsules with a polyamide, polyester, polyurea, polyurethane, poly(etherurethane), poly(etherurethaneurea) membrane and others. Each of these polymers ensures that the membrane formed therefrom has at least one reactive group necessary for establishing a covalent bond with the fibre.

The composite capsules obtained by interfacial polycondensation in a dispersed medium have mechanical strength which is particularly suitable for the applications envisaged within the scope of the present invention. The membranes of the capsules obtained by this method also offer a level of porosity which is optimal for said applications.

Another advantage of the capsules obtained by interfacial polycondensation in a dispersed medium is that it is possible to obtain biocompatible capsules, that is to say capsules that are biologically acceptable and not toxic to humans, animals, plants and living organisms in general. This is particularly significant when using fibres grafted by composite capsules for preparing fabrics and clothing likely to come into contact with living tissues, such as human skin, so as to avoid problems regarding allergies or toxicity. The method for obtaining biocompatible composite capsules of this type is described in more detail in patent application FR-A-2 837 724.

Synthesis of capsules by interfacial polycondensation in a dispersed medium also enables encapsulation of almost all lipophilic or lipophobic active ingredients depending on the type of dispersion concerned. Depending on the porosity of the membrane and the formulation of the active substance encapsulated, it is thus possible to obtain releasing capsules (the active ingredient is released by rupturing the membrane), diffusing capsules (the active ingredient is diffused through the membrane) and phase-changing capsules enabling energy to be stored and emitted in the form of heat due to the changing phase of the active ingredient.

It has also recently been found that it is possible to prepare, by interfacial polycondensation, capsules containing a complexing active substance, such as crown ethers. "Trapping" capsules of this type and the method for preparation thereof are described in detail in patent application FR-A-2 838 655.

All of the advantages disclosed above, the highly flexible operating conditions and the choice of raw materials mean that the composite capsules obtained by interfacial polycondensation in a dispersed medium are preferably used in the grafting method of the present invention. Any other type of capsule may, of course, be suitable, but under the above defined conditions relating to the presence of reactive groups at the surface of the membranes of said capsules, it being possible for said groups to be present initially or to be identified or even created by one or more chemical, physical or physicochemical treatments.

The diameter of the capsules which may be grafted onto the fibres may vary greatly and is generally between several nanometers and several millimeters. However, and so as to conserve the qualities of the fibre, for example, in particular those qualities to the touch, the capsules used in the method of the invention preferably have a diameter between approximately 0.05 $\mu$m and approximately 100 $\mu$m, advantageously between approximately 0.1 $\mu$m and approximately 10 $\mu$m, particularly preferably between approximately 0.5 $\mu$m and approximately 5 $\mu$m and particularly preferably a diameter of approximately 1 $\mu$m.

It should be noted that the size of the capsules must be adjusted to the size of the fibres, fibres having a large diameter being able to support relatively voluminous capsules, whereas fine fibres, for example microfibres, will preferably be grafted by capsules having a diameter smaller than one micrometer ($\mu$m), or even a lot smaller than one micrometer.

For example, for capsules having a diameter of approximately 1 $\mu$m, the yarn count of the fibre will advantageously be between approximately 1 dtex and approximately 7 dtex, that is to say a diameter, depending on the nature of the fibre concerned, between approximately 10 $\mu$m and 30 $\mu$m. In the case of microfibres, the diameter of the capsules will preferably be smaller than 1 $\mu$m.

Whatever the size of the capsules and the fibres and whatever the nature of the capsules and the fibres, the grafting method always involves covalent bonds between the capsules and the fibres.

Thus, the present invention relates to a method for grafting hollow or solid composite capsules onto a support said method comprising the following steps:
a) optionally preparing the capsules so as to adapt the lipophilic/hydrophilic character of the surface of the capsule depending on the nature of the support;
b) functionalising the surface of the capsules;
c) activating the functionalised capsules and/or the support by grafting reactive groups able to form covalent bonds with the reactive groups present at the surface of the support and/or the functionalised capsules respectively;
d) contacting functionalised and possibly activated capsules with the possibly activated support and creating covalent bonds between said capsules and said support; and
e) recovering and rinsing the support comprising composite capsules grafted by covalent bonds.

It should be understood that steps a) and b) may be carried out in reverse order, that is to say step b) before step a). It is thus possible to functionalise the surface of the capsule then to optionally modify the hydrophilic/lipophilic character of the surface of the capsule in order to adapt it to that of the support.

The term "adapt" within the meaning of the present invention means to modify the lipophilic/hydrophilic character of the membrane of the capsule so as to make it substantially identical to the lipophilic/hydrophilic character of the support. The aim of this procedure is to make the capsules compatible with the support and makes it possible to reduce and even avoid formation of capsule aggregates, that is to say it is possible to obtain a substantially homogenous and controlled distribution of the capsules on the support.

For example, in the case of grafting polyamide capsules onto cotton fibres, it may be advantageous to modify the capsules in order to give them a hydrophilic character substantially equal to that of cotton. This modification may, for example, be carried out by grafting hydrophilic functions, such as hydroxy (—OH) groups, onto the surface of the capsule membranes.

Any other means, known to the person skilled in the art, making it possible to modify the lipophilic/hydrophilic character of the surface of the capsules is suitable within the scope of the method of the present invention. By way of non-limiting example, it is possible to carry out an ionic treatment or to graft poly(ethyleneglycol) or poly(propyleneglycol) groups so as to increase the hydrophilic character; alkylation of hydroxyl groups can also be carried out or olefinic, aromatic and other groups may be grafted in order to increase lipophilic character.

Step b) of functionalising the surface of the capsules consists of "homogenising" the reactive groups at the surface of the capsule and/or improving their availability and/or increasing their number.

"Homogenisation" means a chemical, physical or physicochemical treatment making it possible to obtain reactive groups at the surface of substantially identical capsules.

For example, synthesis of polyamide membrane capsules by interfacial polycondensation in a reverse phase leads to the presence of reactive groups, available at the surface of the membrane, of the amine, ammonium, carboxylic acid, carboxylate and acyl chloride type. The action of a diamine-type compound makes it possible to transform the groups carrying a carboxylic function into amine functions and adjusting the pH values makes it possible to convert the ammonium functions into amine functions, as shown in the following diagram in which R represents a bivalent radical:

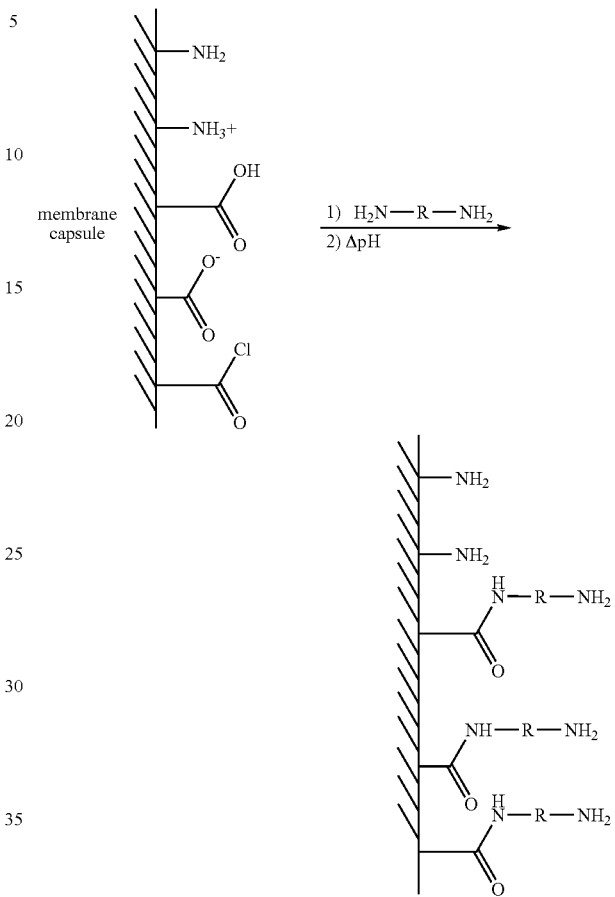

Thus, the surface of the capsule only has amine-type reactive groups, which enables optimisation and better control of the subsequent reaction of grafting onto the support with the activation molecule. In fact, the functional groups, which are all identical, only implement a single type of reaction in order to form the covalent bond between the capsule and the activation group. The amine-type reactive groups are also more numerous (as is seen in the diagram above), thus allowing a larger number of covalent bonds.

However, it is not compulsory for all the functional groups, after functionalisation, to necessarily be identical, but it is preferable for them to be able to intervene in the formation of a covalent bond, for example with the activation group, according to a preferably single, chemical reaction having rapid irreversible kinetics.

As indicated above, functionalisation may be carried out, for example by modifying the pH and/or by grafting compounds generally having at least two reactive groups, one of the groups enabling covalent bonding with the reactive groups present at the surface of the capsules, the other reactive group remaining unchanged during this step and being able to be used in the formation of the covalent bond with the support via the activation group.

The chemical, physical and physicochemical treatments involved in the above-mentioned functionalisation treatment are of any type and are known to the person skilled in the art and are, for example, methods of grafting by covalent bonding, pH adjustments, etc.

Non-limiting examples of such compounds having at least two reactive groups and being more particularly suitable in the case of polyamide membrane capsules obtained by interfacial polycondensation in a reverse phase include diamines, triamines, tetraamines and polyamines in general, in particular α,ω-diamines, including poly(oxyalkylene)amines.

Without wanting to introduce any limitations, the amines described above are, according to a preferred embodiment of the present invention, selected from ethylene diamine, diethylenetriamine, triethylenetetramine, tetraethylenepentamine, tris-amino-ethylamine, linear poly(ethylene)imines, branched poly(ethylene)imines and poly(oxyalkylene) amines, in particular those known under the trade name Jeffamine® sold by Hunstman, more particularly those in the ED, EDR, D and T range, and in particular Jeffamine® EDR-148 and Jeffamine® D-230 or even Jeffamine® T-403.

All these amines enable homogeneous functionalisation of the surfaces of the capsule membranes, the capsules resulting from step b) of the method according to the present invention having, in this case, substantially identical —NH$_2$ functional groups.

The capsules functionalised as described above, in particular functionalised by amine groups, in particular the polyamide membrane capsules obtained by interfacial polycondensation in a reverse phase and functionalised by amine groups, form an integral part of the present invention.

According to a particularly advantageous embodiment of the method of the present invention, steps a) and b) may be carried out simultaneously in a single step. It is also possible to carry out the above-described lipophilic/hydrophilic adaptation by means of the compound(s) used for the above-described homogenisation treatment of the reactive groups at the surface of the capsule membrane.

According to an advantageous embodiment the present invention thus relates to a method for grafting hollow or solid composite capsules onto a support, said method comprising the following steps:

a') adapting the lipophilic/hydrophilic character of the capsule depending on the nature of the support, and simultaneously functionalising of said surface;

b') activating the functionalised capsules and/or the support by grafting reactive groups able to form covalent bonds with the reactive groups present at the surface of the support and/or the functionalised capsules respectively;

c') contacting the optionally activated capsules with the optionally activated support and creating covalent bonds between the reactive groups of said capsules and the reactive groups of said support; and d') recovering and rinsing the support comprising composite capsules grafted by covalent bonding.

In particular, the grafting of compounds from the family of poly(oxyalkylene)amines at the surface of polyamide composite capsules obtained by interfacial polycondensation in a reverse phase not only provides said capsules with a hydrophilic character which is compatible with that of cotton fibres, but also enables homogeneous functionalisation of the reactive groups, in this case amino (—NH$_2$) groups, at the surface of said capsules.

Entirely satisfactory results have been obtained by grafting onto hollow polyamide composite capsules, obtained by interfacial polycondensation in a reverse phase, of Jeffamine® D-230 or Jeffamine® EDR-148, corresponding to the following formulae:

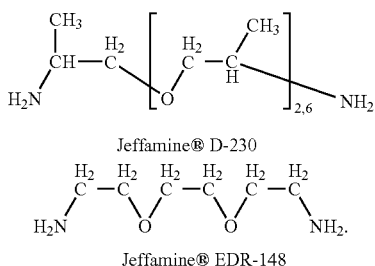

Jeffamine® D-230

Jeffamine® EDR-148

Figure 2:
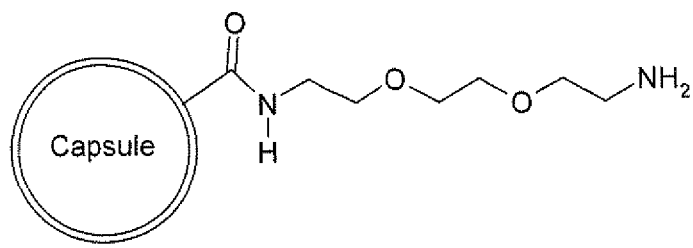
FIG. 2 schematically shows a polyamide capsule according to the invention.

The capsules functionalised as defined above also form part of the present invention. By way of example, FIG. 1 schematically shows a polyamide capsule functionalised by an amine of formula H$_2$N—R—NH$_2$ where R represents the residue of the functionalisation compound. FIG. 2 is a diagram of the functionalised capsule of FIG. 1 where the functionalisation compound is Jeffamine® EDR-148.

Step c) (or b')) of the method according to the present invention is the step for activating the surfaces of the capsules which have been functionalised and of which the lipophilic/hydrophilic character has optionally been adapted to that of the support to be grafted by said capsules. According to a variant, activation may be carried out on the support itself or even on the support and on the capsules simultaneously.

During this activation step, the functional groups present at the surface of the capsules and/or of the support are replaced and/or modified by a chemical, physical or physicochemical treatment in such a way as to observe, at the surface of the capsules and/or the support, the reactive groups able to form covalent bonds with the reactive groups present on the support and/or the capsules respectively, the reaction of forming covalent bonds preferably being a total, irreversible rapid kinetic reaction and advantageously not requiring the action of a catalyst.

The reactions for creating covalent bonding will also advantageously be reactions which take place at atmospheric pressure and at temperatures between −10° C. and 100° C., preferably close to ambient temperature.

It is thus preferred to provide capsules having on their surface reactive groups able to form covalent bonds with the support, advantageously a fibre, preferably a textile fibre, by total, irreversible chemical reaction with relatively rapid kinetics. On this subject, reference could advantageously be made to conventional organic chemistry works concerning chemical functions capable of reacting with one another to form covalent bonds.

The covalent bonds described in the present invention may be of any type known to the person skilled in the art and specialised in the field of organic chemistry and are defined, in particular, by J. March, "Advanced Organic Chemistry", 3rd edition, pp. 3-9.

The following table provides non-limiting and illustrative examples of covalent bonds included within the scope of the present invention and resulting from interaction between a reactive group A and a reactive group B, it being possible for such groups A and B to be present either on the support or at the surface of the capsule:

| Reactive group A | Reactive group B | Resulting covalent bond |
| --- | --- | --- |
| carboxylic acid | hydroxy (—OH) | Ester |
| acyl halide | amine (—NH$_2$) | Amide |
| halide | hydroxy (—OH) | Ether |
| isocyanate | amine (—NH$_2$) | Urea |
| isocyanate | hydroxy (—OH) | Urethane | capsules respectively. Thus, for example, after the step of activating the capsules, said capsules have a number of groups capable of reacting, with the support equal to two times, three times or more times the number of reactive groups normally observed with an activation compound having only one group capable of reacting with said support.

By way of non-limiting example, the organic compound (activation group) capable of forming a covalent bond between the surface of the functionalised capsule and the support may be selected from those shown in the following table:

| Activation group | | Type of bond obtained |
| --- | --- | --- |
| α-bromo acrylic acid | 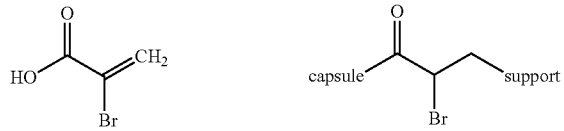 | 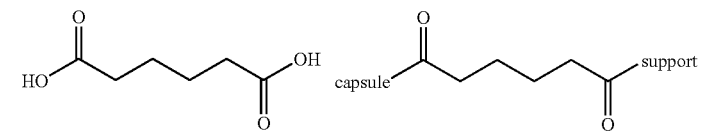 |
| adipic acid | | |
| 2,4,6-trichlorotriazine | | |
| dichloroquinoxaline |  | 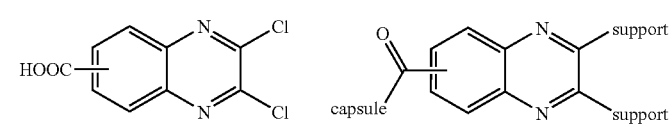 |

The functionalised capsules and/or the support may, for example, be activated by grafting, onto the functional groups present at the surface of the capsules and/or the support, compounds (activation groups) having at least one reactive group able to form a covalent bond with the reactive groups present on the support and/or the capsules respectively, said reaction preferably being total and irreversible and having relatively rapid kinetics.

The compounds enabling activation of the functionalised capsules and/or the support may be of any type known to the person skilled in the art comprising at least two reactive groups, one with the functional groups present at the surface of the capsules, and the other with the functional groups present at the surface of the support. These compounds may also be oligomers, and even polymers.

According to an advantageous embodiment, the compounds enabling activation of the functionalised capsules and/or the support have two, three or even more reactive groups with the groups present on the support and/or the Other activation groups (or compounds) which may advantageously be used within the scope of the present invention are, for example, those usually used within the field of textile fibre dyes and are known to the person skilled in the art and skilled in the art of dyeing textiles.

The capsules activated as described above, in particular functionalised by amine groups, in particular the polyamide membrane capsules obtained by interfacial polycondensation in a reverse phase, functionalised by amine groups and activated using the above-defined activation compounds form an integral part of the present invention.

Figure 3:
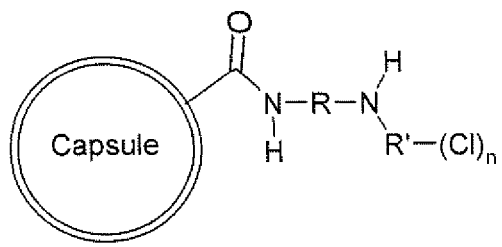
FIG. 3 schematically shows a polyamide capsule according to the invention.

A particularly preferred example of an activated capsule is a hollow or solid polyamide composite capsule optionally containing at least one active ingredient and functionalised by amine (—NH$_2$) groups and activated so as to have chlorine (—Cl) groups. FIG. 3 is a diagram of the capsule thus defined, where R and R' represent the residues of the functionalisation and activation compounds respectively, shown below, and n represents an integer equal to 1, 2 or 3:

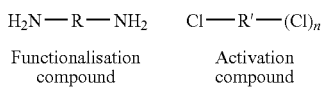

Preferred functionalised and activated capsules as defined above and shown in FIG. 3 are those for which the functionalisation compound is selected from ethylenediamine, diethylenetriamine, triethylenetetramine, tetraethylenepentamine, tris-amino-ethylamine, linear poly(ethylene)imines, branched poly(ethylene)imines and poly(oxyalkylene) amines, more preferred are those selected from ethylenediamine, diethylenetriamine, triethylenetetramine and poly (oxyalkylene)amines, in particular those known under the trade name Jeffamine® sold by Hunstman, and even more preferred are those from the ED, EDR, D and T series and, in particular, Jeffamine® EDR-148, Jeffamine® D-230 or even Jeffamine® T-403.

Preferred functionalised and activated capsules as defined above and shown in FIG. 3 are those for which the activation compound is selected from α-bromo-acrylic acid, adipic acid, 2,4,6-tricholortriazine and dichloroquinoxaline, preferably 2,4,6-trichlorotriazine.

Figure 4:
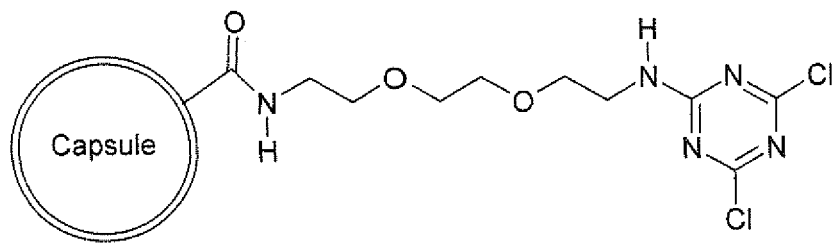
FIG. 4 schematically shows a polyamide capsule according to the invention.

A particularly preferred polyamide composite capsule is that shown in FIG. 4, functionalised with Jeffamine® EDR-148 and activated with 2,4,6-trichlorotriazine. This capsule is, in particular, entirely suitable for grafting onto cotton fibres, on the one hand due to its hydrophilic character (contributed by the Jeffamine®) which is substantially identical to that of cotton fibre and, on the other hand, due to its chlorine reactive groups (2 atoms of chlorine for one Jeffamine®) enabling the formation of a covalent bond by reaction with the hydroxyl functions of the cotton fibre (cellulose), a reaction which is total and irreversible and has relatively rapid kinetics.

This reaction for forming the covalent bond between the functionalised and activated capsule and the support, in particular the fibre, corresponds to the actual grafting of the capsule onto the support, in particular the fibre.

As indicated above, before carrying out said grafting, it may prove to be necessary to pre-treat the support, in particular if the reactive groups are not directly accessible and/or are in protected form at the surface of said support. This pre-treatment generally consists of "revealing" the reactive groups present on the support or, if there are no, or not enough, reactive groups of this type, identifying or creating them by means of one or more chemical, physical or physicochemical treatments.

The pre-treatments of the supports are known to the person skilled in the art and consist, in a non-limiting example, of plasma or corona-type treatments or other types of treatment. In the case of natural, synthetic or artificial fibres, in particular in the case of textile fibres, these treatments are generally similar, and even identical, to the pre-treatments carried out in the field of dyeing and tinting textiles.

For details regarding the pre-treatments, reference may thus also be made to works dealing with textile dyeing. Thus, if the support is a textile fibre, it may be subjected to one or more treatments selected from singeing, desizing, boiling off, bleaching, washing, carbonising, beating, scouring, fixing and others.

By way of example, a cotton fibre is generally pre-treated before grafting, the pre-treatment consisting of three procedures: desizing, boiling off and bleaching. The following table gives other examples of possible pre-treatments which are currently used in the textile industry depending on the nature of the fibres:

| Fibres | Steps | Conditions |
|---|---|---|
| Cotton | Singeing | Pyrolysis at 1200° C. |
| | Desizing | enzymatic at 60° C. or acidic at cold temperature |
| | Boiling off | NaOH, 100 g/l, 100° C., 20 min. |
| | Bleaching | NaClO, $H_2O_2$ |
| Wool | Singeing | 1200° C. |
| | Washing | $Na_2CO_3$, pH = 10-11 |
| | Carbonising | $H_2SO_4$, steaming at 100-140° C., 100° C. |
| | Bleaching | $H_2O_2$ |
| | Beating | mechanical process |
| | (Anti-felting) | NaClO, pH = 6-7, T < 10° C. |
| Synthetic | Desizing | Water, detergents at elevated temperature |
| | Scouring | Water, detergents at elevated temperature |
| | Fixing | Water (120° C.) or hot air (190° C.), 10-30 s |

Of course, other pre-treatments are also possible, in particular if they are used to reveal the reactive groups at the surface of the support or even to improve their availability with regard to the reactive groups of the selected activation compound. The reactive groups present at the surface of the support may be of any type, depending on the nature and/or origin of the support, whether natural, artificial or even synthetic.

By way of examples to illustrate the nature of these reactive chemical groups, a cotton fibre is a cellulose fibre having, at its surface and after optional treatment, free hydroxyl functions. A wool fibre has at its surface at least one, more or even all the amino acid functions, that is to say carboxylic acid, amine, thiol, phenol and amide functions, etc.

Reactive chemical groups are obviously also present on synthetic fibres and, for example, amine groups and carboxylic acid groups in the case of polyamide fibres, or even alcohol groups and carboxylic acid groups on polyester fibres. Glass fibres also have reactive groups, such as silanol (Si—OH) groups.

These chemical groups on the fibres are thus able to form covalent bonds with the reactive groups present on the functionalised and activated capsules, as described hereinbefore, the reactions for creating covalent bonds advantageously having the features described above in the description.

The reaction for grafting the functionalised and activated capsules onto a support is thus carried out in a conventional manner known to the person skilled in the art, for example, in the case of textile fibres, by a similar, or even identical method to that used for dyeing fibres and textiles, for example by the full-bath method or even by padding. As will be seen hereinafter, the grafting reaction may be carried out either onto the fibres or directly onto the textile processed from the fibres and, generally, either directly onto the support, as defined hereinbefore, or onto a finished product, including a support, as defined hereinbefore.

According to a variant of the grafting method of the present invention, the support, after possible pre-treatment(s), may be activated, for example by means of one or more activation groups, as defined above, in order to activate the functionalised capsules. In this case, the actual grafting reaction, that is to say the formation of the bond between the capsule and the support, is carried out between the functionalised capsule and the activated support.

It may also be envisaged to carry out the actual grafting reaction between a functionalised and activated capsule and an activated support. According to another variant, it is also possible to carry out the actual grafting reaction between a non-functionalised and non-activated capsule, of which the lipophilic/hydrophilic character will, however, have been adapted previously, and an activated support. However, this last variant is not a preferred embodiment of the present invention.

Figure 5:
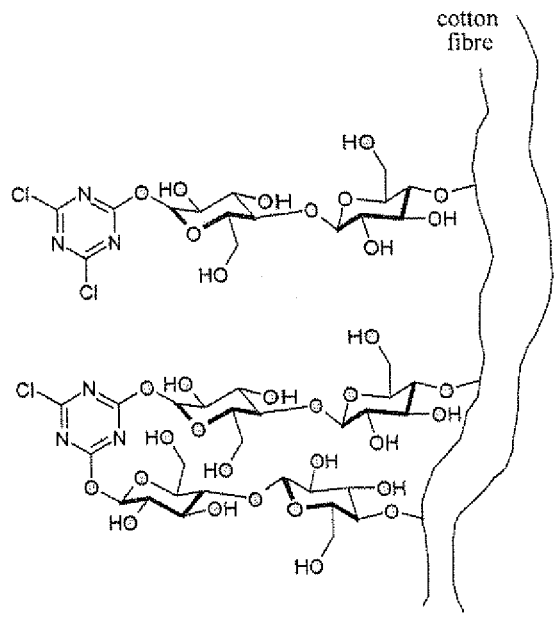
FIG. 5 is a diagram of a cotton fiber activated by 2,4,6-trichlorotriazine that can be grafted by the functionalized polyamide capsules according to the invention.

FIG. 5 is a diagram of a cotton fibre activated by 2,4,6-trichlorotriazine and able to be grafted by functionalised capsules, advantageously capsules primarily having free amine functions on their surface and, for example, functionalised capsules such as those shown in FIG. 1 or FIG. 2.

The reaction conditions for grafting depend on the type of support and the type of capsules used. The reaction may be carried out in an aqueous, hydro-organic or organic medium, for example in water or in cyclohexane, within suitable pH ranges.

It may also be advantageous to carry out the reaction in the presence of an electrolyte and/or a surfactant so as to increasingly facilitate the affinity between the capsules and the support, that is to say to promote contact between the capsules and the support. Inorganic salts, such as sodium carbonate ($Na_2CO_3$) may, for example, be used as electrolytes when grafting polyamide capsules onto cotton fibres. The use of surfactants, such as Hypermer® 1083 or else Tween® 20 has also proved to be effective, in particular for grafting hollow or solid polyamide composite capsules functionalised by Jeffamine® and activated by 2,4,6-trichlorotriazine onto cotton fibres.

The present invention also relates to a support grafted by functionalised and activated composite capsules. In particular, a cotton fibre grafted by hollow or solid polyamide composite capsules functionalised by Jeffamine® EDR-148 and activated with 2,4,6-trichlorotriazine forms a particularly preferred embodiment of the present invention In a variant, the present invention also relates to an activated support grafted by functionalised composite capsules, of which the lipophilic/hydrophilic character has optionally previously been adapted to that of said support.

Figure 6:
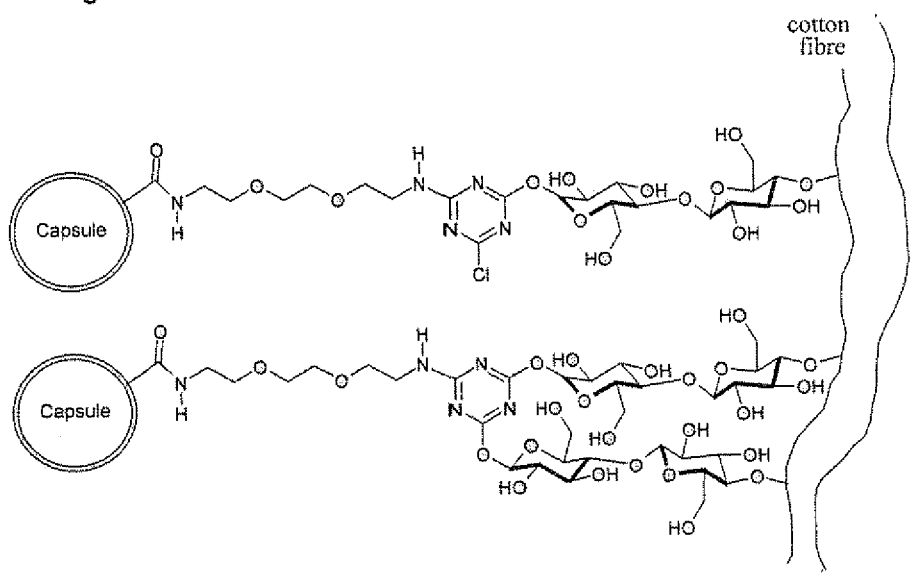
FIG. 6 is a diagram of a cotton fiber activated by 2,4,6-trichlorotriazine and grafted to functionalized polyamide capsules according to the invention.

FIG. 6 is a diagram of a grafted cotton fibre. This grafted fibre may be obtained either by grafting functionalised capsules as shown in FIG. 2 with an activated cotton fibre as shown in FIG. 5, or by grafting functionalised and activated capsules as shown in FIG. 4 with a simply pre-treated cotton fibre, that is to say a cotton fibre having free hydroxy functions at its surface.

The fibres obtained thus have on their surface composite capsules grafted by covalent bonds. This type of bond thus ensures a resistance to chemicals and mechanical strength, in particular to prolonged and repeated washing.

This type of grafting by covalent bonding also enables the fibre to be worked as in the textile industry. The grafted fibres may thus be parallelised then twisted together so as to form threads, which may then be assembled by weaving or knitting so as to form the two-dimensional support, which is the fabric. The fibres may also be directly interlaced so as to obtain non-woven-type materials.

According to a conventional procedure, well-known in the field of textiles, the fabrics undergo, before the conventional post-treatments, other stages of finishing and, in particular, dyeing (staining and/or printing). Printing is generally carried out by means of revolving cylinders or even by inkjet. With regard to dyeing, this is usually carried out in a jigger or by padding.

With regard to this subject, and together with the similarity between the conventional method for dyeing textiles and the method for grafting capsules according to the present invention, it may be envisaged to graft the capsules onto the fibres either after or during conventional finishing and construction procedures, that is to say directly onto the threads or else onto the fabric, ready-made articles and other textile materials. An alternative of this type to the method for grafting capsules onto threads, onto fabric, onto ready-made articles and other fibre-based textile materials is also included within the field of the present invention.

The method for grafting capsules onto threads or onto fabric is identical to the method for grafting capsules onto fibres and also results in the formation of one or more covalent bonds between the capsules and the fibres, which constitute the threads and/or the fabric. One of the advantages of grafting capsules onto fabric is the fact that it is possible to graft capsules onto textile materials that are not processed from fibres. It is thus possible to graft composite capsules according to the method of the present invention onto textile materials such as natural, artificial or synthetic leather.

The fabrics and other textile materials thus grafted by composite capsules behave exactly like conventional fabrics within the field of textiles and, consequently, may then enter into the construction phase. This procedure consists of transforming the fabric and other textile materials into textile articles, for example ready-made articles such as clothing, trims, gloves, hosiery, tights, scarves, capes and canvas articles (tents, canopies) or even carpets, rugs, wall coverings, bed linen, gas mask containers, military fabrics and textiles, patches, dressings, woven prostheses, etc.

The different supports envisaged in the present description, in particular fibres, threads, fabrics, textile materials and ready-made articles, but also leather, wood, paper, glass, polymer plastics materials, coatings, paints, varnishes, etc., grafted by covalent bonding to composite capsules according to the method of the present invention have an altogether beneficial use in a wide range of fields for producing articles having particularly beneficial properties, depending on the nature of the support, the chemical nature of the polymer of the capsule and the type of active ingredient optionally present in the capsules.

By way of example, if the support is a textile fibre or a thread, a textile fabric, a fabric, etc., the method of the present invention enables production of functional textiles, that is to say conferring a new, additional use to said textiles.

The possible applications may initially be linked to the mechanical and/or physicochemical properties of the grafted capsules themselves, that is to say in the absence of an encapsulated active ingredient. Hollow or solid capsules of this type grafted, in particular, onto fibres, threads, fabrics and other textile materials may thus find particularly beneficial uses for producing adhesive or anti-adhesive, anti-slip textiles, etc.

Other fields of application are linked to the chemical nature of the polymer of the capsule. In particular, if the capsule is biocompatible (see patent application FR-A-2-837 724), applications for human or animal treatment can be envisaged.

Furthermore, the capsules may also contain one or more liposoluble or water-soluble active ingredients in their core which may be able to be released immediately, in a delayed, free or prolonged manner, or which may also not be released at all and remain inside the capsules; said capsules thus confer to the various supports onto which they are grafted particular and specific properties having added value in various fields of application, such as the industrial, domestic, medical, paramedical, cosmetic and civil and military defence sectors.

It should also be understood that the capsules envisaged in the method of the present invention, which contain one or more active ingredients, may be "reloaded". This term means that the active ingredient(s) present at the start and which have diffused outside the capsule or which have been eliminated by any chemical, physical or physicochemical means, (for example by washing(s)) from the grafted support, may be introduced again into the capsules. It may thus be envisaged to treat the supports by soaking, dipping or spraying the active ingredient so as to "reload" said capsules.

It is also necessary to differentiate between supports, such as the fibres, threads, fabrics and other textile materials, grafted by capsules which are able to release one or more active ingredients and those grafted by capsules, of which the active ingredient produces its action inside the capsule without being released.

In the first case (release of the active ingredient) this may be achieved by mechanically rupturing the membrane (shearing), by chemically rupturing the membrane (digestion, photochemical degradation) or even by diffusion.

Thus, depending on the nature of the active ingredient which may be released by the capsules, the supports, such as the fibres, threads, fabrics, ready-made articles and other textile materials comprising said grafted fibres, may be used, for example, as disinfectant textiles, bactericidal textiles, perfumed textiles, refreshing textiles, moisturising agents, slimming agents, depilatory textiles, anti-UVs, anti-mite textiles, insecticides, anti-stress textiles, anti-fatigue textiles, textiles containing anti-slip agents, or even adhesive agents, textiles containing washing additives, for example anti-static agents, softening agents, bleaching agents or else enzymes, etc.

These non-limiting examples, which are given purely by way of illustration, have many possible applications. More specifically, the fibres grafted according to the present invention may also be used to prepare threads, fabrics, ready-made articles and other textile materials used in the medical sector and in the paramedical sector as anodyne textiles, veinotonics, vasculoprotectors, anti-inflammatories, etc.

In the case of fibres, threads, fabrics and other textile materials grafted by composite capsules with a non-releasable active ingredient, the possible applications are also very diverse and varied and include, inter alia, their use as paramagnetic, antiseptic, anti-rejection, anti-coagulant textile materials concerning, more particularly, the paramedical and medical sector.

In the industrial sector or the sector of civil and military protection, the applications include, for example, textiles for protecting against chemical attack agents and able to fix polluting agents, such as heavy metals or radioactive elements.

It may also be envisaged to produce flame-resistant textiles, for example, by incorporating into the core of the grafted capsules flame-retardant agents, such as methylphosphonic acid. Other applications may also be envisaged and are also included within the scope of the present invention.

It should also be understood that applications of this type may be combined, either by mixing different active ingredients in the same capsule or by grafting composite capsules of differing nature onto fibres, threads, fabrics and textile materials, or even by mixing fibres which differ with regard to the nature of the capsules which are grafted onto them. The combination of two or three of the techniques detailed above is also possible.

The supports which may be envisaged in the method of the present invention may also be composite supports. Supports of this type may, for example, be grafted by capsules containing an adhesive agent, so as to reinforce said supports with the object of obtaining better cohesion during ageing under stress, for example for blocking microfissures in concrete, cement, plastics materials, wood and other materials.

The present invention is described in greater detail in the specific embodiments below. These examples are purely illustrative and are in no way intended to limit the invention.

EXAMPLES

Synthesis of Polyamide Composite Capsules by Interfacial Polycondensation in a Reverse System Capsules are synthesised in accordance with the method described in French patent applications FR-A-2 837 724 and FR-A-2 838 655, or even in the publication by R. Arshady, *J. Microencap.*, 6(1) (1989), 1-10 and 13-28), with the following particular conditions:

Step a): Dispersion 85 ml of cyclohexane and Hypermer® at 10 g/l were placed in a Waring-Blendor homogeniser. Then, 70 ml water, 0.5 M hexamethylenediamine and 1 M sodium hydrogencarbonate were added. Stirring was fixed at 18,000 rpm for 5 minutes.

Then the dispersion was transferred to a 1 L beaker inside an ultrasound tank in which water and ice had been placed.

The dispersion was sonicated for 5 minutes with stirring at 100 rpm using a horizontal blade made of polytetrafluoroethylene.

Step b): Interfacial Polycondensation (20 % Water, 80 % Cyclohexane)

Start of the Reaction Inside the Ultrasound Tank:

200 ml of cyclohexane, Hypermer® 1083 at 10 g/l, 0.15 M terephthaloyl dichloride (TDC) and 15% mesoyl trichloride (MTC) (percentage in acid chloride functions (COCl) of MTC relative to the total number of COCl functions contributed by the TDC and MTC monomers) were added drop-by-drop to the dispersion inside the ultrasound tank. The reaction mixture is always sonicated during the addition of this solution and stirring at 100 rpm in the beaker is maintained so as to ensure good homogenisation during the synthesis. This operation last for approximately 30 minutes.

Progress of the Reaction in the Sovirel Reactor

The reaction medium was transferred to a Sovirel reactor set to 25° C. and stirring was fixed at 200 rpm until the end of synthesis (24 hours).

Step c): Washing the Capsules

At the end of the reaction, the capsules were centrifuged at 2,500 rpm for 5 min so as to separate the capsules from the reaction medium. A first stage of washing consisted of taking up the sediment with 200 ml of chloroform containing Hypermer® 1083 at 10 g/l, stirring the dispersion thus obtained at 200 rpm for 15 min then centrifuging it at 2,500 rpm for 5 min.

In a second step, the sediment is taken up with 500 ml cyclohexane containing Hypermer® 1083 at 10 g/l, the dispersion is stirred at 200 rpm for 15 min then centrifuged at 2,500 rpm for 5 min. This second step of washing is repeated three times.

So as to store the capsules, the base is taken up with 200 ml cyclohexane containing Hypermer® 1083 at 10 g/l and the dispersion is stirred at 200 rpm for 5 min. The capsules may be conserved in this solution.

Capsules having a diameter of approximately 1 µm are obtained, of which the membrane is a polyamide polymer and of which the core, having no active ingredient, is filled with water.

Modification of the Membrane

Functionalisation of the Membrane by Grafting Ethylenediamine

The capsules (centrifugation pellet, approximately 70 ml) are taken up in 200 ml of a mixture of cyclohexane and Hypermer® 1083 at 10 g/l. This is placed in a Sovirel reactor set to 25° C. then 70 ml of a mixture of cyclohexane, Hypermer® 1083 at 10 g/l and a 0.5 M ethylenediamine (EDA) solution are added. Stirring is maintained at 200 rpm for 1 hour then the reaction is stopped. The reaction medium is then centrifuged. The capsules are then washed according to the method described above (step c): washing the capsules).

Other functionalised capsules were also prepared in this way by replacing ethylenediamine with triethylenetetramine, tris-amino-ethylamine and Jeffamine®-EDR 148.

Activation of Capsules Functionalised by Grafting Trichlorotriazine

The functionalised capsules obtained previously (centrifugation pellet) are taken up in 200 ml of a mixture of cyclohexane and Hypermer® 1083 at 10 g/l.

The whole mixture is placed in a Sovirel reactor set to 25° C. and 70 ml of a mixture of cyclohexane, Hypermer® 1083 at 10 g/l and 0.5 M 2,4,6-trichlorotriazine solution are added. Stirring is maintained at 200 rpm for 45 minutes. After the reaction has stopped the reaction medium is centrifuged and the capsules are washed according to the method described above (step c): washing the capsules).

Thus, polyamide membrane capsules are obtained by interfacial polycondensation with a reverse system, on which are grafted, by covalent bonding, trichlorotriazine molecules. These capsules have at their surface chlorine reactive groups able to form covalent bonds with the hydroxyl functions of the cellulose of the cotton fibre.

Pre-Treatment of Cotton

Step 1: Desizing

A sample of cotton fabric is placed in a beaker containing 600 ml water with 20% detergent. The solution is brought to 60° C. and stirred for one hour. The sample is taken up and rinsed with water.

Step 2: Boiling Off

The sample of desized fabric is taken up and dipped in a 2.5 M sodium hydroxide solution. The solution is brought to 95° C. and stirred for one hour. The sample is taken up and rinsed with water.

Step 3: Bleaching

The sample of desized and boiled off fabric is taken up and dipped in a sodium hypochlorite solution at 48 chlorometric degrees and 0.5 ml/l. The solution is brought to 60° C. and stirred for 30 minutes. The sample is taken up and rinsed with water.

Grafting Capsules Onto the Cotton Sample

Step 1: Preparation of the Capsules

The capsules are grafted according to a method similar to dyeing cotton fibres, as described, for example, in "Basic principles of textile coloration" by A. D. Broadbent, edited by "Society of dyers and colourists", 2001.

The capsules conserved in a cyclohexane/Hypermer® 1083 phase at 10 g/l are centrifuged at 2,500 rpm for 5 minutes so as to separate them from the organic medium.

The pellet is recovered then dispersed in 600 ml water at pH 5 (buffer medium: potassium hydrogen phthalate and sodium hydroxide) containing 5% Tween® 20 (v/v). The dispersion obtained is stirred for 15 min at 500 rpm. The Tween® 20 allows the cyclohexane to be eliminated. The dispersion is centrifuged at 2,500 rpm for 5 minutes. These three operations are repeated three times so as to eliminate any trace of cyclohexane.

The pellet is recovered then dispersed in 600 ml water at pH 5. The dispersion is stirred for 15 min at 500 rpm. The dispersion is centrifuged again at 2,500 rpm for 5 min. These two operations are repeated three times so as to eliminate any trace of Tween® 20. Finally, the microcapsules are recovered in 600 ml water at pH 5.

Step 2: Grafting

A programmable Nuance TS-type Ahiba® colour matching machine fitted with 12 bottles (autoclaves for containing the grafting bath) fixed onto a drum is used. This machine is usually used to carry out dyeing by means of depletion in a full bath.

A volume V (ml) of the dispersion of the microcapsules obtained in step 1 above is removed and placed in a bottle containing the fabric sample. The ratio of fabric mass ($M_{fabric}$ in g) on the volume of the bath (volume $V_{bath}$=V removed in ml) defines the ratio of the bath $R_{bath}$:

$$R_{bath} = \frac{M_{fabric}(g)}{V_{bath}(mL)}$$

The ratio of the grafting bath of this example is fixed at 1:15. So as to favour adsorption of the microcapsules on the cotton fabric, 30 g/l $Na_2CO_3$ is added. The increase in temperature on the machine is programmed at a rate of 3° C./min. The final temperature for grafting microcapsules onto the cotton fibres is fixed at 50° C. The bath is kept under stirring (10 rpm) for 15 min at the fixed temperature.

At the end of this adsorption step, the bottle is removed from the machine. Sodium hydroxide (NaOH) is added so as to increase the pH and to enable the chemical reaction between the reactive groups at the surface of the capsules (2,4,6-trichlorotriazine chlorine atoms) and the hydroxyl groups of the cotton fibres.

The bottle is put back in the machine, the temperature of the bath is brought to 50° C. and the pH is approximately 10.5-11. The reaction is carried out for approximately 45 to 90 min.

At the end of the reaction, the fabric is recovered then rinsed with water until neutralised, that is to say the surface of the adjacent fabric has a pH of 7. This last step also makes it possible to eliminate particles which are not fixed on the fabric.

Controlling the Grafting

Figure 7:
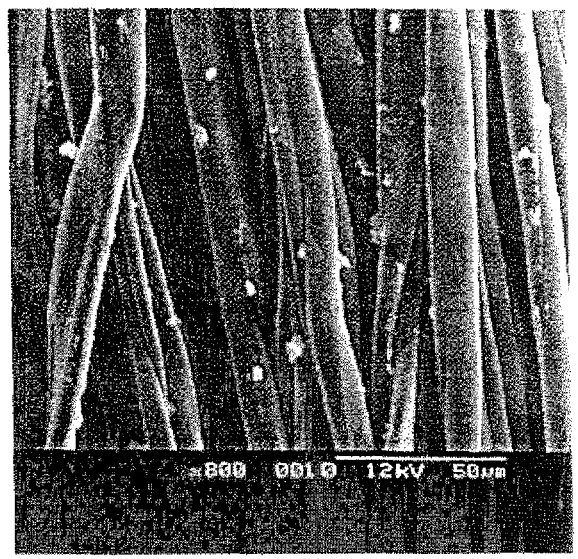
FIG. 7 is an electron scanning microscopy photograph of cotton fibers grafted to polyamide capsules according to the invention.

For this operation, the presence of capsules grafted onto the fibres is tested by observing pictures taken with an electron scanning microscope;

FIG. 7 shows cotton fibres grafted by polyamide composite capsules prepared by interfacial polycondensation with a reverse system functionalised by ethylenediamine and activated by 2,4,6-trichlorotriazine.

Figure 8:
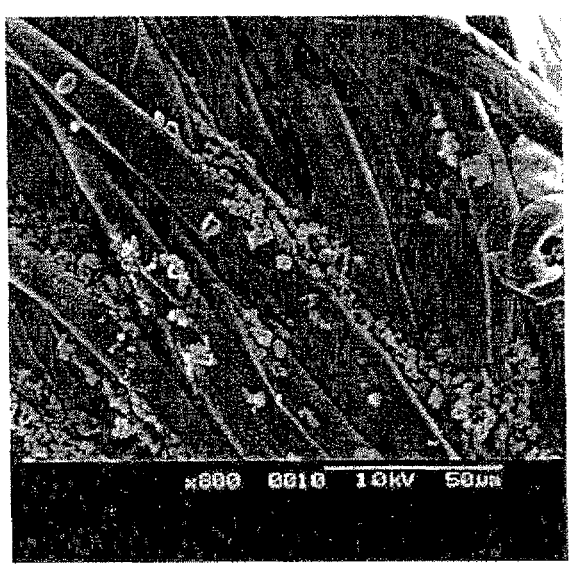
FIG. 8 is an electron scanning microscopy photograph of cotton fibers grafted to polyamide capsules according to the invention.

FIG. 8 shows cotton fibres grafted by polyamide composite capsules prepared by interfacial polycondensation with a reverse system functionalised by Jeffamine® D-230, a poly (oxyalkylene)amine and activated with 2,4,6-trichlorotriazine.

Comparison of the fibres obtained shows, on the one hand, the absence of capsule agglomerates on the fibres in the two cases illustrated. On the other hand, use of a hydrophilic functionalisation amine enables better grafting, in terms of the number of capsules grafted, onto the fibres.

The method of the present invention thus makes it possible to graft hollow or solid composite capsules onto any type of support, in particular organic or inorganic (glass, carbon, natural, artificial or synthetic textile fibre) fibres in a controlled and homogeneous manner.

In fact, the grafting method makes it possible, on the one hand, to control the rate of grafting onto the support and, on the other, to obtain a homogeneous or at least more homogeneous distribution of the capsules on the support than with the methods for grafting by covalent bonding known from the prior art, in particular for grafting capsules onto textile fibres.

The invention claimed is:

1. A method for grafting hollow or solid composite capsules onto a support, said method comprising the following steps:
   a) optionally preparing the capsules so as to adapt a lipophilic/hydrophilic character of a capsule membrane depending on the nature of the support;
   b) functionalising the membrane of the capsules by grafting a functionalization compound selected from the group consisting of: ethylenediamine, diethylenetriamine, triethylenetetraamine, tetraethylenepentamine, tris-amino-ethyl amine and poly(oxyalkylene)amines;
   c) activating the functionalised capsules, the support, or both the functionalized capsules and the support, by grafting reactive groups from an activation compound selected from the group consisting of: α-bromo-acrylic acid, adipic acid, 2,4,6-trichlorotriazine and dichloroquinoxaline, said reactive groups being able to form covalent bonds with other reactive groups present at a surface of the support and/or the functionalised capsules;
   d) contacting the functionalised capsules with the support from step c) and grafting the capsules to the support by forming covalent bonds between said capsules and said support; and
   e) recovering and rinsing the support comprising composite capsules grafted to the support by covalent bonding.

2. The method according to claim 1, wherein the functionalised capsules are activated in step c).

3. The method according to claim 1, wherein the support is activated in step c).

4. The method according to claim 1, wherein the hollow or solid composite capsules have been produced by interfacial polycondensation.

5. The method according to claim 1, wherein the capsules are hollow or solid polyamide composite capsules.

6. The method according to claim 1, wherein the support is a fibre.

7. The method according to claim 1, wherein the support is a textile fibre.

8. The method according to claim 1, wherein the support is a cotton textile fibre.

9. The method according to claim 1, wherein the support is a cotton textile fibre having free hydroxyl groups at the surface.

10. The method according to claim 1, wherein the functionalising step b) comprises grafting functionalisation compounds having at least two reactive groups, one of the at least two reactive groups enabling a covalent bond with other reactive groups present at the surface of the capsules, an other one of the at least two reactive group remaining unchanged during step b) and being able to be used in forming the covalent bond between said capsules and said support as defined in step d).

11. The method according to claim 1, comprising the following steps:
   a') adapting the lipophilic/hydrophilic character of the capsule depending on the nature of the support and simultaneously functionalising said surface of the capsule;
   b') activating the functionalised capsules, the support, or both the functionalized capsules and the support by grafting reactive groups, said reactive groups being able to form covalent bonds with other reactive groups present at the surface of the support and/or the functionalised capsules;
   c') contacting the capsules with the support from step b') and grafting the capsules to the support by forming covalent bonds between the reactive groups of said capsules and the reactive groups of said support; and
   d') recovering and rinsing the support comprising composite capsules grafted to the support by covalent bonding.

12. The method according to claim 1, wherein the functionalising step (b) comprises at least one of modifying the pH and grafting compounds having at least two reactive groups, one of the at least two reactive groups enabling a covalent bond with other reactive groups present at the surface of the capsules, an other one of the at least two reactive group remaining unchanged during step (b) and being able to be used in forming the covalent bond between said capsules and said support in step (d).

13. The method according to claim 1, wherein the activating step (c) consists of replacing and/or modifying the surface of the capsules by chemical, physical or physicochemical treatment, the groups functionalised into reactive groups being able to form covalent bonds with the other reactive groups present on the support.

14. The method according to claim 1, wherein, prior to grafting the capsules to the support, the support is subjected to one or more chemical, physical or physicochemical treatments.

15. The method according to claim 1, wherein, prior to grafting the capsules to the support, the support is subjected to one or more plasma treatment and corona treatment.

16. The method according to claim 1, wherein,
   the support is a textile fibre, and
   prior to grafting the capsules to the support, the support is subjected to one or more pre-treatments selected from singeing, desizing, boiling off, bleaching, washing, carbonising, beating, scouring and fixing.

17. The method according to claim 1, wherein the step of grafting the capsules onto the support is carried out in the presence of an inorganic salt.

18. The method according to claim 1, wherein grafting the support and the capsules comprises a reaction between carboxylic acid and hydroxy groups, acyl halide and amine groups, halide and hydroxy groups, isocyanate and amine groups or isocyanate and hydroxy groups.

19. The method according to claim 1, wherein the capsules are grafted directly onto a support comprising threads, fabric, ready-made articles or textile materials.

20. The method according to claim 1, wherein the functionalizing step (b) comprises grafting a functionalisation compound selected from the group consisting of: ethylenediamine, diethylenetriamine and poly(oxyalkylene)amines of formulae:

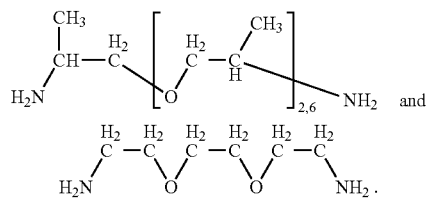

and

21. The method according to claim 1, wherein the grafting reaction between the support and the capsules comprises a reaction between halide and hydroxy groups.

22. The method according to claim 1, wherein the activation compound is selected from the group consisting of:
   α-bromo-acrylic acid, 2,4,6-trichlorotriazine, and dichloroquinoxaline.

23. The method according to claim 1, wherein the capsules are hollow or solid polyester, polyamide or polyurethane composite capsules.

24. The method according to claim 1, wherein the activation compound is selected from the group consisting of:
α-bromo-acrylic acid, 2,4,6-trichlorotriazine, and dichloroquinoxaline, and wherein the capsules are hollow or solid polyester, polyamide or polyurethane composite capsules.

\* \* \* \* \*

UNITED STATES PATENT AND TRADEMARK OFFICE
CERTIFICATE OF CORRECTION

PATENT NO. : 8,586,143 B2  Page 1 of 1
APPLICATION NO. : 12/279990
DATED : November 19, 2013
INVENTOR(S) : Frere et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this
Twenty-second Day of September, 2015

Michelle K. Lee
*Director of the United States Patent and Trademark Office*